(12) United States Patent
Martin

(10) Patent No.: US 8,336,472 B2
(45) Date of Patent: Dec. 25, 2012

(54) MULTI DIAMETER GAUGE WHEEL

(76) Inventor: Howard D. Martin, Elkton, KY (US)

( * ) Notice: Subject to any disclaimer, the term of this patent is extended or adjusted under 35 U.S.C. 154(b) by 0 days.

(21) Appl. No.: 13/288,012

(22) Filed: Nov. 2, 2011

(65) Prior Publication Data

US 2012/0042812 A1 Feb. 23, 2012

Related U.S. Application Data

(63) Continuation of application No. 11/543,637, filed on Oct. 5, 2006, now Pat. No. 8,069,798.

(51) Int. Cl.
*A01C 5/00* (2006.01)
*A01C 13/00* (2006.01)

(52) U.S. Cl. ......................................... 111/193

(58) Field of Classification Search .................. 111/139, 111/190–195; 172/538, 701
See application file for complete search history.

(56) References Cited

U.S. PATENT DOCUMENTS 6,321,667 B1 * 11/2001 Shoup ........................... 111/137

* cited by examiner

*Primary Examiner* — Christopher J. Novosad
(74) *Attorney, Agent, or Firm* — Hamilton IP Law, PC; Jay R. Hamilton; Charles A. Damschen

(57) ABSTRACT

A seed planting assembly comprises a depth regulating member and a residue driving member. The depth regulating member and residue driving member may be integrally formed as one structure, or they may be formed separately and later joined to one another. A method of planting comprises selecting the geometries of the depth regulating member and residue driving member for a given set of conditions so that the depth regulating member facilitates travel of a planting unit over debris.

9 Claims, 10 Drawing Sheets

MULTI DIAMETER GAUGE WHEEL

CROSS REFERENCE TO RELATED APPLICATIONS

Applicant states that this application claims priority from and is a continuation of U.S. patent application Ser. No. 11/543,637 filed on Oct. 5, 2006 now U.S. Pat. No. 8,069,798, which application is incorporated by reference herein in its entirety.

FIELD OF THE INVENTION

The methods described herein are generally applicable to the field of agricultural equipment. The embodiments shown and described herein are more particularly for improved travel of seed planters in minimum or no-till conditions with less plugging of seed planters due to residue.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

Figure 1:
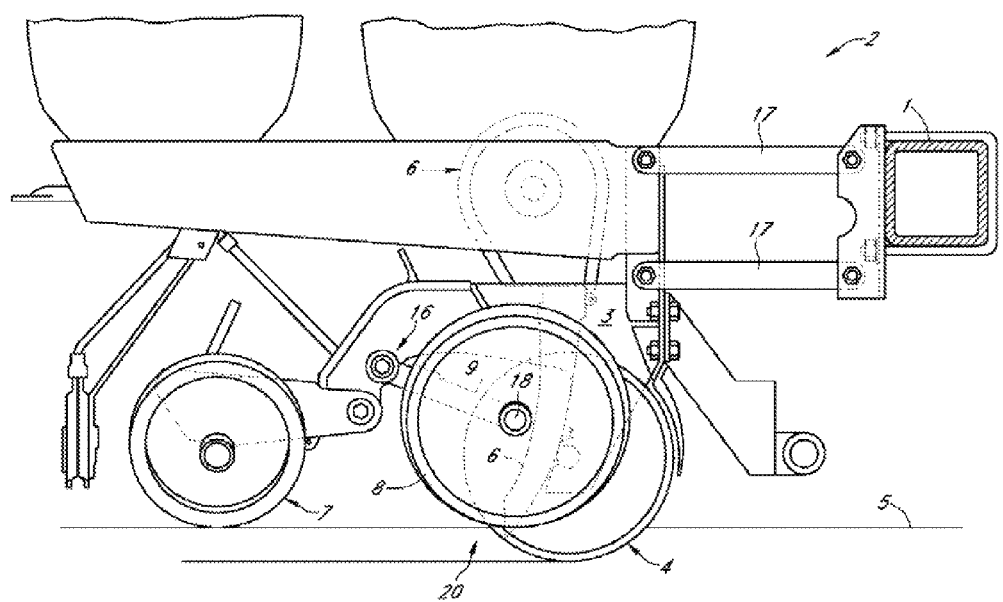

FIG. 1 provides a side view of a first embodiment of a row planter unit.

Figure 2:
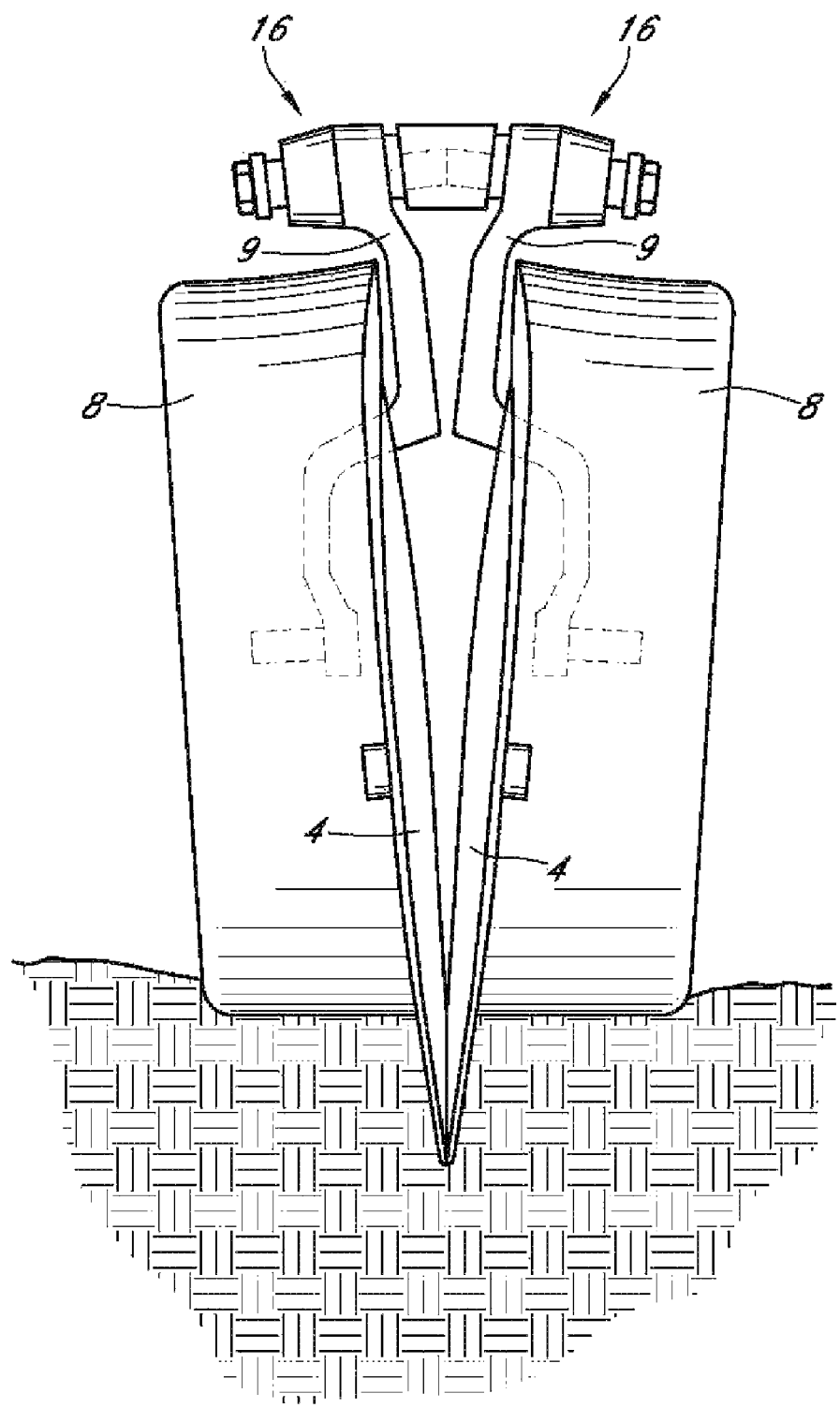

FIG. 2 provides a rear view of a first embodiment of a furrow opening device with a depth regulation device of the prior art.

Figure 3:
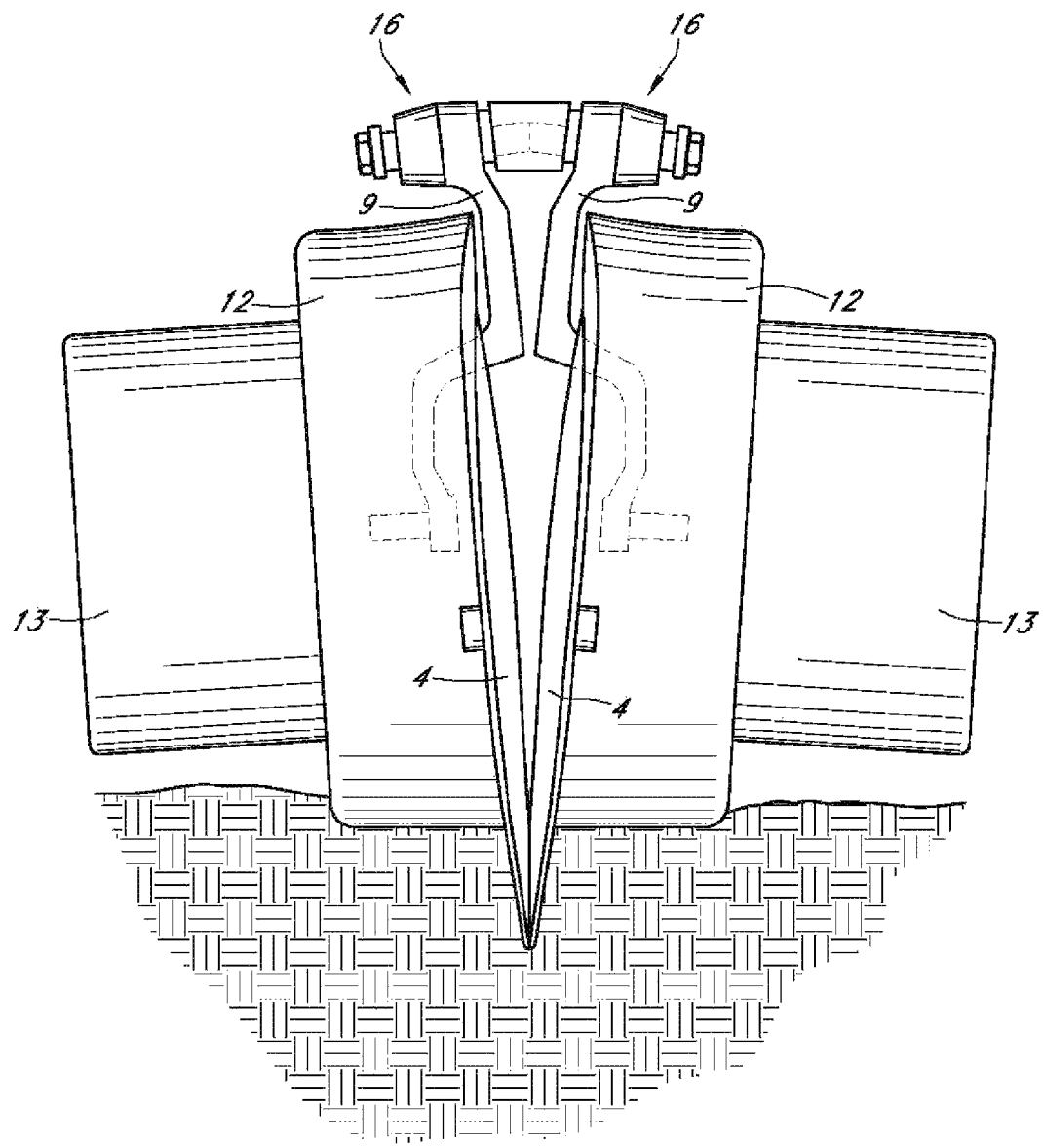

FIG. 3 provides a rear view of a first embodiment of a depth regulation device having a plurality of diameters.

Figure 4:
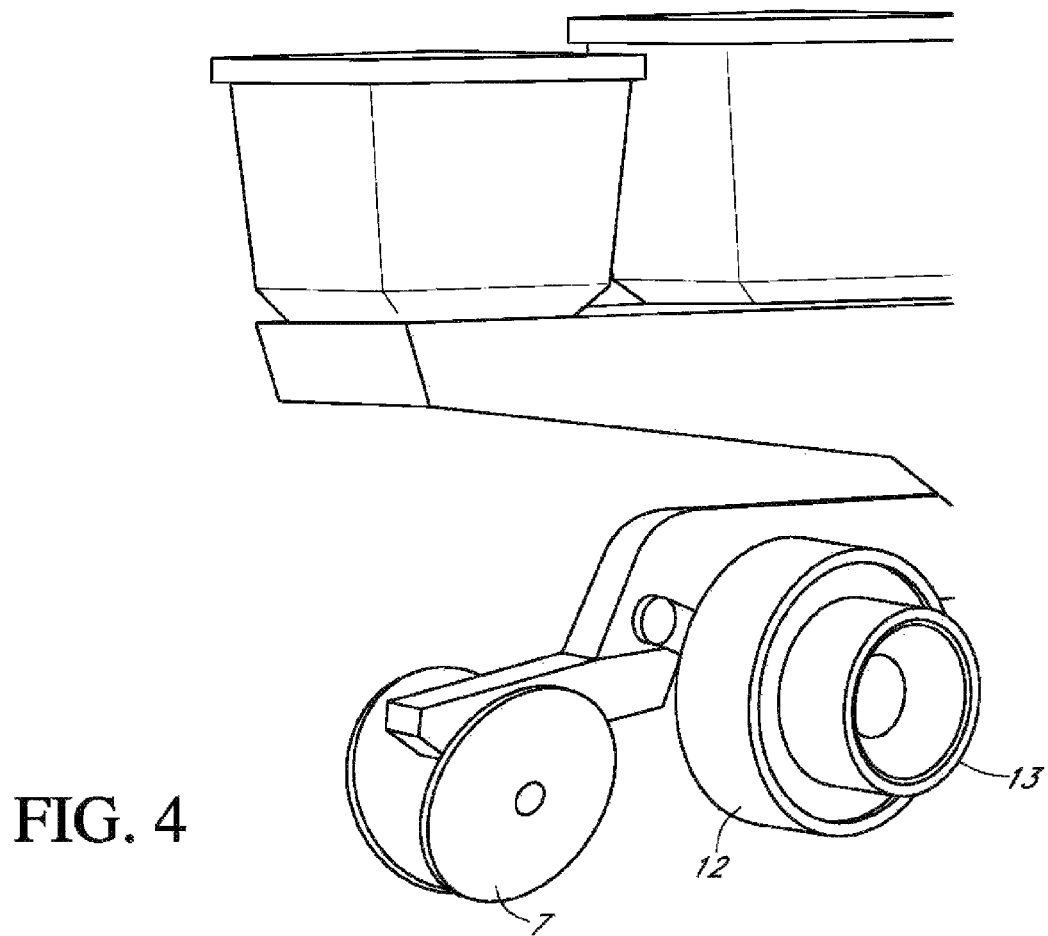

FIG. 4 provides a perspective view of a first embodiment of the depth regulation device having a plurality of diameters.

Figure 5:
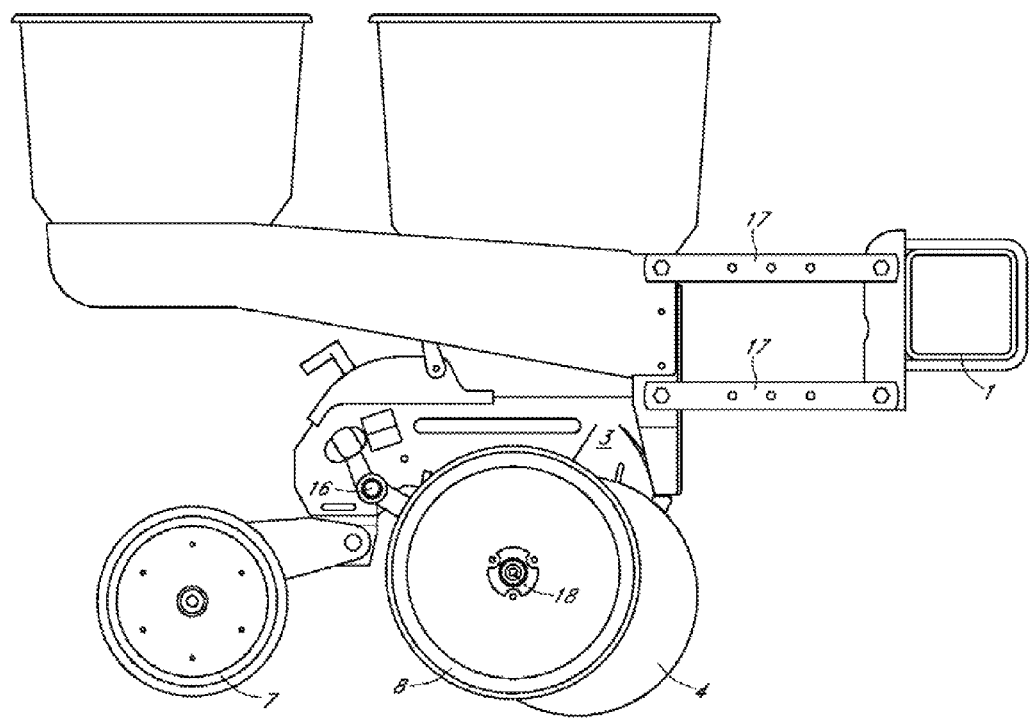

FIG. 5 provides a side view of a second embodiment of a row planter unit.

Figure 6:
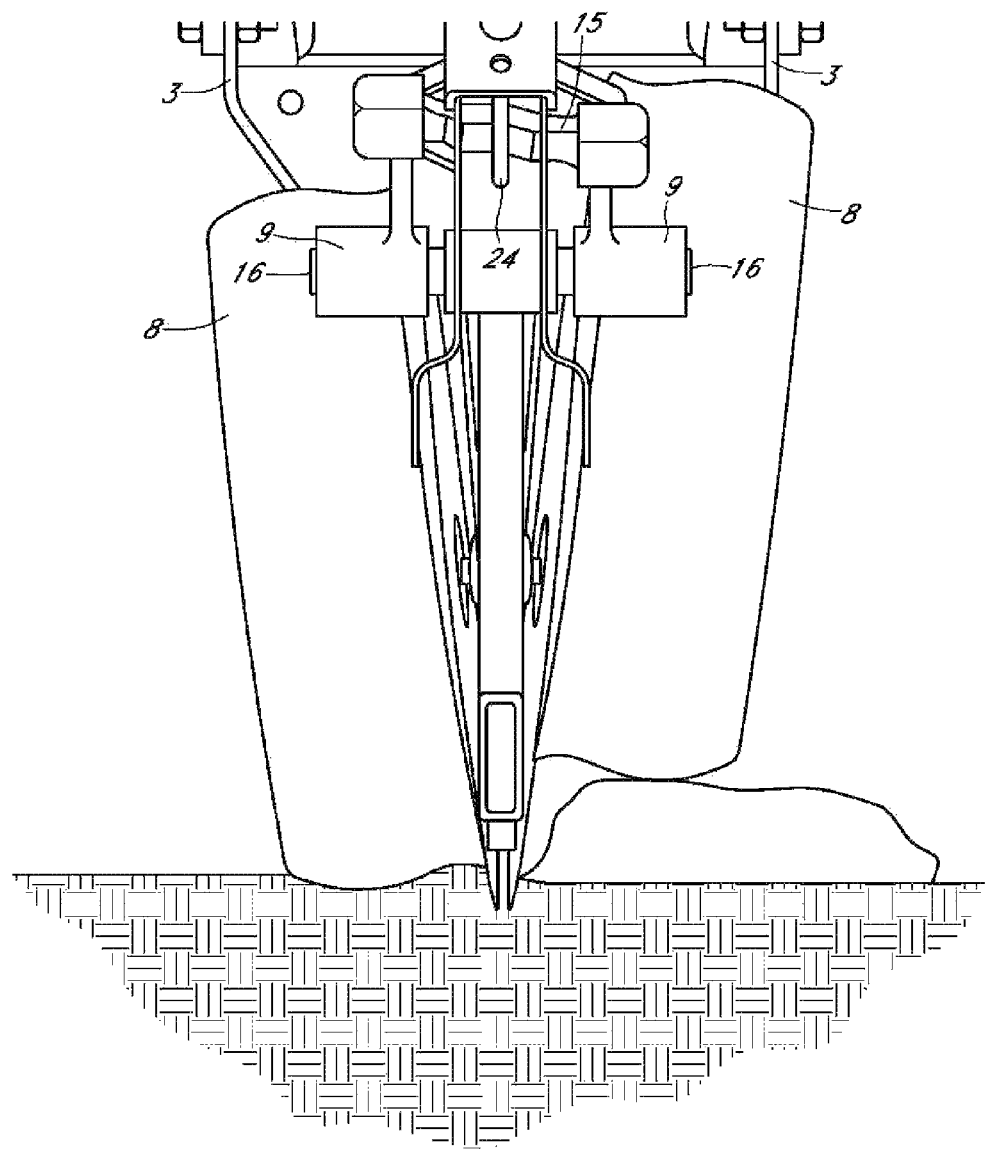

FIG. 6 provides a rear view of a second embodiment of a furrow opening device with a depth regulation device of the prior art.

Figure 7:
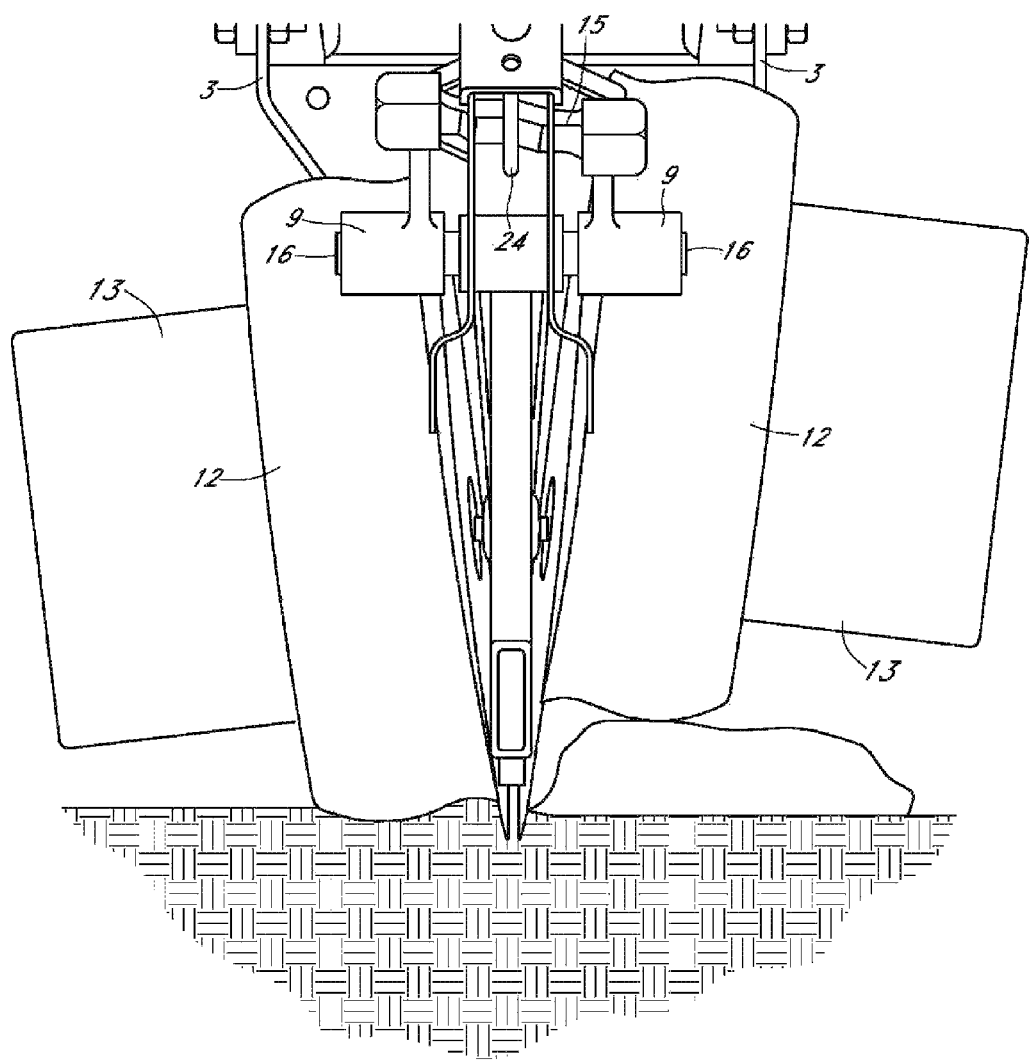

FIG. 7 provides a rear view of a second embodiment of a depth regulation device having a plurality of diameters.

Figure 8:
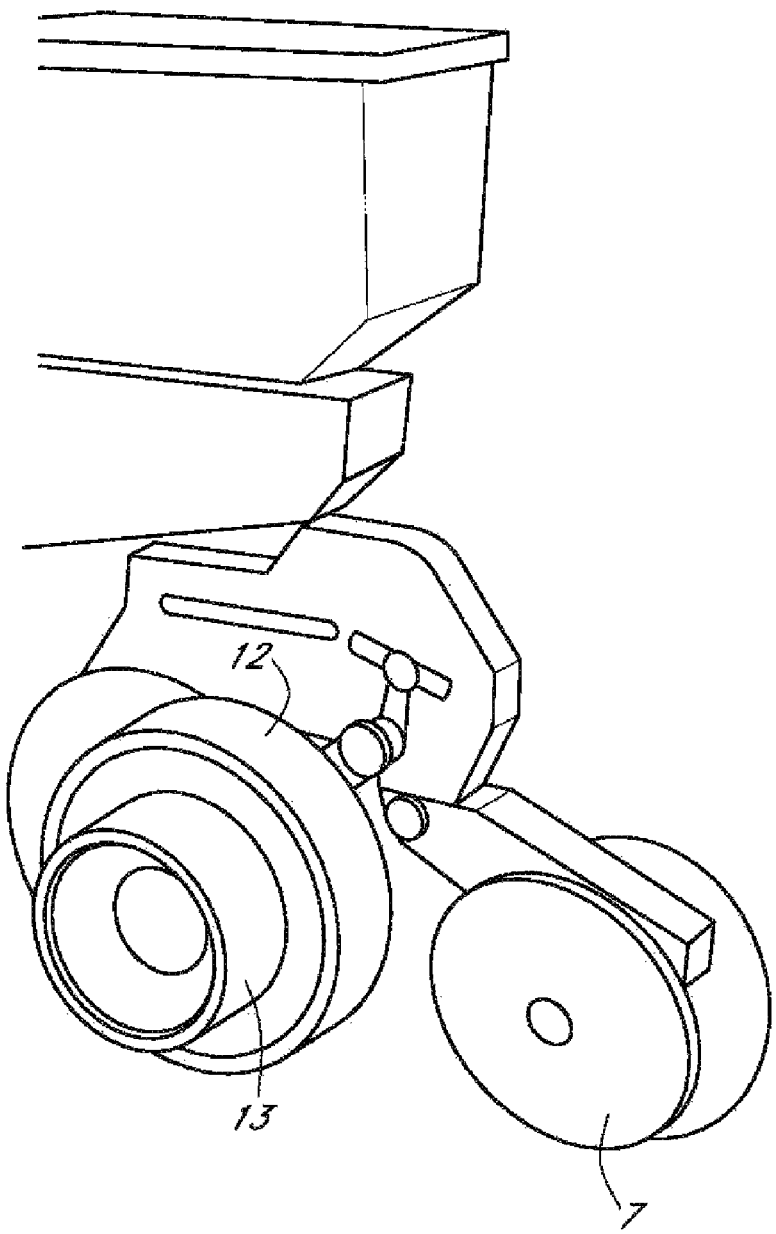

FIG. 8 provides a perspective view of a second embodiment of the depth regulation device having a plurality of diameters.

Figure 9A:
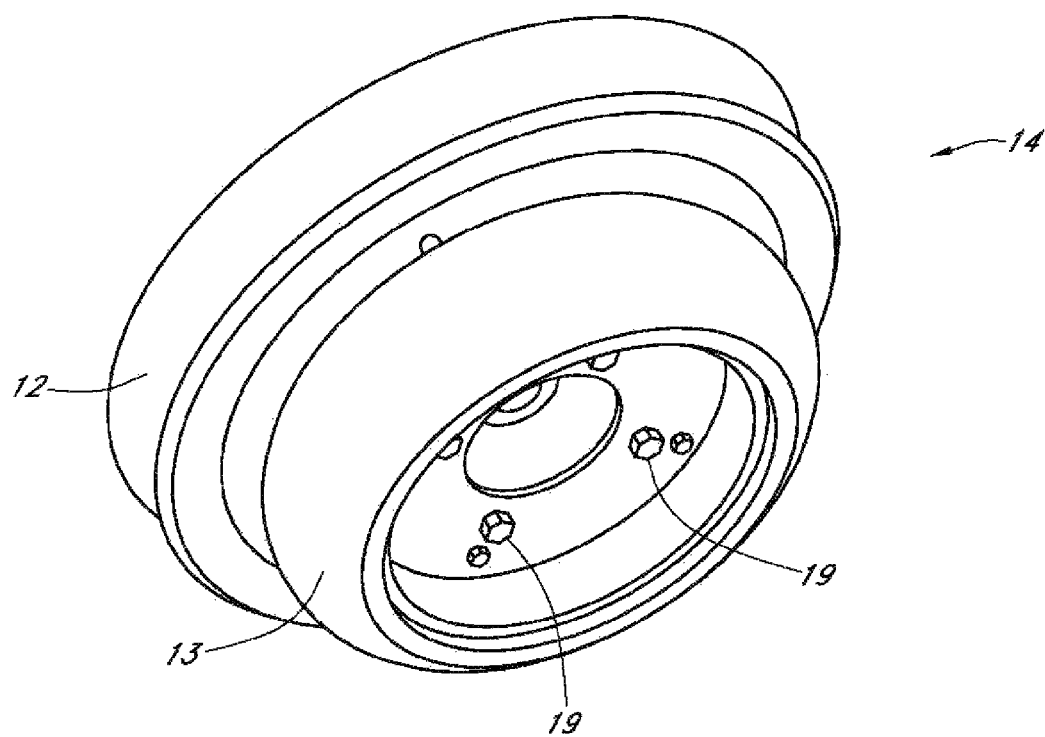

FIG. 9A provides a perspective view of a multi diameter gauge wheel.

Figure 9B:
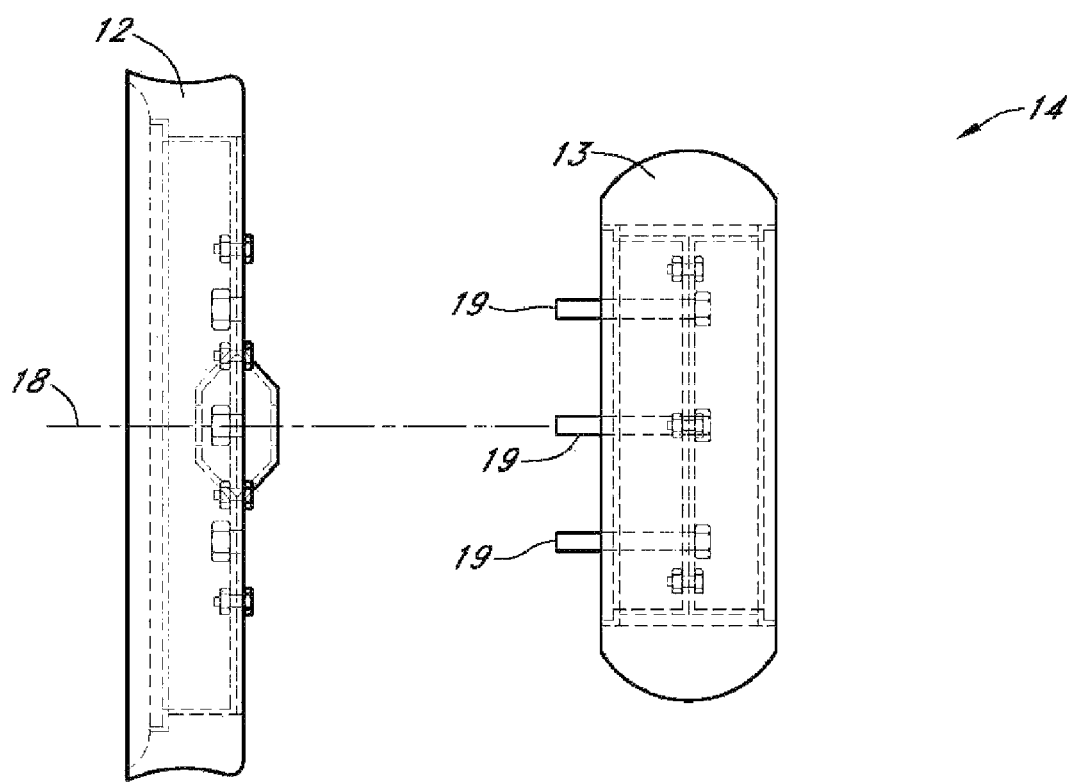

FIG. 9B provides an end view of a multi diameter gauge wheel with the gauge wheel first and second portions separated.

DETAILED DESCRIPTION - LISTING OF ELEMENTS

| Element Description | Element Number |
| --- | --- |
| Lateral Support Member | 1 |
| Planting Unit | 2 |
| Planting Unit Frame | 3 |
| Furrow Opening Assembly | 4 |
| Ground Surface | 5 |
| Seed Delivery Assembly | 6 |
| Furrow Closing Assembly | 7 |
| Gauge Wheel | 8 |
| Pivoting Arm Assembly | 9 |
| Stop | 10 |
| Row Cleaner | 11 |
| Gauge Wheel First Portion | 12 |
| Gauge Wheel Second Portion | 13 |
| Multi Diameter Gauge Wheel | 14 |
| Saddle Link | 15 |
| Gauge Wheel Arm Pivot | 16 |
| Parallel Linkage | 17 |
| Gauge Wheel Rotation Axis | 18 |
| Gauge Wheel Bolt | 19 |
| Furrow | 20 |
| Yoke Link | 24 |

DETAILED DESCRIPTION OF INVENTION

Referring now to the drawings, wherein like reference numerals designate identical or corresponding parts throughout the several views, FIG. 1 shows a lateral support member 1 of a seed planting assembly with a planting unit 2 attached to said lateral support member 1 via parallel linkage 17, which is one means of attaching a planting unit 2 to the lateral support member 1 as recited in the claims. The planting unit 2 includes a furrow opening assembly 4, a planting unit frame 3, a pivoting arm assembly 9 with a gauge wheel 8 rotatably attached at one end, a seed delivery assembly 6 and a furrow closing assembly 7. The seed planting assembly shown in FIGS. 1 and 4 is of the type disclosed in U.S. Pat. No. 5,427,038, "Adjustable Gauge Wheel for a Planter" issued to Ege (hereinafter Ege), which is incorporated by reference herein and well known to those skilled in the art. The seed planting assembly shown in FIGS. 5 and 8 is similar to that disclosed in U.S. Pat. No. 6,148,747, "Equalizing Gauge Wheel Mechanism for Row Crop Planter" issued to Deckler et al. (hereinafter referred to as Deckler), which is also incorporated by reference herein and also well known to those skilled in the art. The present art is shown in combination with the prior art in FIGS. 3, 4, 7 and 8. The embodiment disclosed in Deckler also generally includes a furrow opening assembly 4, a planting unit frame 3, a pivoting arm assembly 9 with a gauge wheel 8 rotatably attached at one end, a seed delivery assembly 6 and a furrow closing assembly 7. The present invention may be applied to existing seed planting assemblies with any number of planting units 2 attached to the lateral support member 1. Accordingly, the scope of the present invention is not limited by the number of planting units 2 engaged with the lateral support member 1 of the seed planting assembly. In the embodiments described and disclosed herein, a double disc opener is shown as one type of furrow forming means as recited in the claims, and selection of alternate furrow forming means in no way limits the scope of the current invention.

FIG. 2 provides a rear view of one embodiment of a furrow opening assembly 4 and a gauge wheel 8, one type of depth regulating means as recited in the claims, of the prior art. In FIG. 3, the multi diameter gauge wheel 14 is shown as two distinct portions affixed to one another with a plurality of gauge wheel bolts 19, with each portion having dimensions unique to that portion. Gauge wheel bolts 19 are one type of affixing means for affixing the gauge wheel second portion 13 to the gauge wheel first portion 12 as recited in the claims. In this embodiment, the multi diameter gauge wheel 14 communicates with the planting unit frame 3 in substantially the same manner as gauge wheels 8 of the prior art, such as the type of gauge wheels 8 disclosed in Ege, communicated with a planting unit frame 3. The multi diameter gauge wheel 14 is engaged with one end of a pivoting arm assembly 9, which is one type of connection means as recited in the claims. The pivoting arm assembly 9 is pivotably engaged with the planting unit frame 3 at the gauge wheel arm pivot 16. A stop 10 defines the limit to vertical motion of the pivoting arm assembly 9, and hence the multi diameter gauge wheel 14, in the direction substantially opposite the ground surface 5.

The gauge wheel first portion 12 is similar in both form and function to gauge wheels 8 of the prior art. The gauge wheel first portion 12 is located adjacent the furrow opening assembly 4 and engages the ground surface 5 that is adjacent the furrow 20. In the embodiments described and disclosed herein, a double disc opener is shown as one type of furrow forming means as recited in the claims, and selection of alternate furrow forming means in no way limits the scope of the current invention. The gauge wheel first portion 12 controls the depth to which the furrow forming assembly 4 is allowed to penetrate the ground surface 5. This depth is adjustable by the seed planting assembly operator and is dictated by the vertical relation between the furrow opening assembly 4 and the gauge wheel first portion 12 in the same manner as the furrow 20 depth is controlled by gauge wheels 8 of the prior art.

The embodiment shown in FIGS. 3 and 4 illustrates an embodiment adapted for attachment to a planting assembly as taught by Ege wherein the gauge wheel second portion 13, which is one type of residue driving means as recited in the claims, is of a smaller diameter than the gauge wheel first portion 12 and of a greater width than the gauge wheel first portion 12. Because the gauge wheel first portion 12 and the gauge wheel second portion 13 are affixed to one another, rotational forces from the gauge wheel first portion 12 are transferred to the gauge wheel second portion 13 and vice versa. Since the gauge wheel first portion 12 is engaged with the ground surface 5 when the seed planting assembly is operating in the field, the gauge wheel first portion 12 rotates according to the direction of travel of seed planting assembly, similar to gauge wheels 8 of the prior art. The resulting rotational forces are transferred from the gauge wheel first portion 12 to the gauge wheel second portion 13 and the gauge wheel second portion 13 rotates at the same rate as the gauge wheel first portion 12. As will be understood by those practiced in arts, the row spacing between planting units 2 determines the limit for the total allowable width of the combined gauge wheel first portion 12 and gauge wheel second portion 13. Furthermore, as will be understood by those practiced in the arts, the present art is not limited to distinct gauge wheel first portions 12 and gauge wheel second portions 13 affixed to one another. The present art may also be embodied by a single continuous multi diameter gauge wheel 14 having at least two distinct diameters wherein the gauge wheel first portion 12 of the multi diameter gauge wheel 14 is adjacent the furrow opening assembly 4 and has a first diameter which is greater than gauge wheel second portion 13, which is adjacent the gauge wheel first portion 12 and non-adjacent the furrow opening assembly 4. Additionally, the present art may also be embodied by a multi diameter gauge wheel 14 having more than two distinct diameters.

The gauge wheel second portion 13 contacts residue on the ground surface between the areas of travel of adjacent furrow opening assemblies 4 and acts as a rotating paddle to slightly compress and then drive the residue through and clear of the seed planting assembly. This rotation of the gauge wheel second portion 13 facilitates travel of the seed planting assembly thereby potentially reducing plugging of the planting unit 2 or elements thereof with residue. The utility of the present art may be further enhanced by placement and utilization of a row cleaner 11 prior to the planting unit 2 as illustrated in FIGS. 4 and 8. The width of the gauge wheel first portion 12 may be sized to engage and contact the ground surface 5 wherein all or a portion of the residue has been removed by the row cleaner 11. The width and diameter of the gauge wheel second portion 13 may then be sized to engage and contact ground surface 5 wherein existing residue is relatively undisturbed and the residue removed from the adjacent ground surface 5 by the row cleaner 11 has accumulated. Row cleaners 11 are well known to those skilled in the arts and are one type of row cleaning means, and selection of alternate means in no way limits the scope of the current invention. A row cleaner 11 exemplary of those available is embodied by U.S. Pat. No. 4,785,890 entitled "Ground-Driven Rotary Row Cleaner" issued to Applicant and incorporated by reference herein.

The embodiments shown in FIGS. 7 and 8 are similar in both form and function to those shown in FIGS. 3 and 4, but are more adapted to a seed planting assembly taught by Deckler. As with the embodiment shown in FIGS. 3 and 4, in this embodiment, the multi diameter gauge wheel 14 communicates with the planting unit frame 3 in substantially the same manner as gauge wheels 8 of the prior art communicated with a planting unit frame 3. The multi diameter gauge wheel 14 is engaged with one end of a pivoting arm assembly 9, which is one type of connection means as recited in the claims. The pivoting arm assembly 9 is pivotably engaged with the planting unit frame 3 at the gauge wheel arm pivot 16. A stop 10 defines the limit to vertical motion of the pivoting arm assembly 9, and hence the multi diameter gauge wheel 14, in the direction substantially opposite the ground surface 5. In the embodiment shown in FIGS. 7 and 8, the stop 10 consists of a yoke link 24, one type of stop means as recited in the claims. A saddle link 15 is placed through the yoke link 24 for communication therewith and the position of the yoke link 24 defines a limit for vertical motion of the gauge wheels 8 in the direction substantially opposite the ground surface 5.

In the embodiment shown in FIG. 7, the gauge wheel second portion 13 is again shown as having a smaller diameter and a larger width than the gauge wheel first portion 12, and the rotational forces from the gauge wheel first portion 12 are transferred to the gauge wheel second portion 13 in the same way as in the embodiments shown in FIGS. 3 and 4. As before, the rotation of the gauge wheel second portion 13 contacts residue on the ground surface between the areas of travel of adjacent furrow opening assemblies 4 and acts as a rotating paddle to slightly compress and then drive the residue through and clear of the seed planting assembly.

In both the embodiment shown in FIGS. 3 and 4 and the embodiment shown in FIGS. 7 and 8, the difference in diameter between the gauge wheel first portion 12 and the gauge wheel second portion 13 is determined for optimal operation in the conditions the planting unit assembly is to be operated. In most embodiments, the diameter of the gauge wheel second portion 13 will be from 5 percent to 40 percent less than the diameter of the first gauge wheel portion 12. Although not shown, the gauge wheel second portion 13 may also consist of a variable diameter wheel that can be adjusted for optimal performance in conditions with varying amounts of residue.

In both the embodiment shown in FIGS. 3 and 4 and the embodiment shown in FIGS. 7 and 8, the difference in width between the gauge wheel first portion 12 and the gauge wheel second portion 13 is also determined for optimal operation in the conditions the planting unit assembly is to be operated. In most embodiments, the width of the gauge wheel second portion 12 will be from 100 percent to 300 percent of the width of the first gauge wheel portion. It will be understood by those practiced in the arts that although not shown herein, the width of the gauge wheel second portion 13 may be greater than, less than or equal to the width of the first gauge wheel portion 12, without limiting the present art.

In planting units 2 such as those described herein, the weight of the elements attached to the planting unit frame 3 generally provide a first source of down pressure to the furrow opening assembly 4. As such, down pressure is necessary for the penetration of the ground surface 5 by the furrow opening assembly 4, and the proper amount of down pressure is critical to achieving optimal emergence and yields. Many times additional means of providing the furrow opening assembly 4 with down pressure are employed and typically called supplemental down pressure systems, which may include pneumatic systems, spring tension systems or pressurized fluid systems. The disclosed invention is applicable to all types of planters regardless of whether the planter is outfitted with a supplemental down pressure means and if so, which type it employs. Accordingly, the scope of the present invention is not limited by the presence or absence of supplemental down pressure means on a given planting unit 2 or the type of supplemental down pressure means.

Although not shown herein, the present invention may also be practiced by allowing the diameter of the second portion to exceed the diameter of the first portion. The difference in diameters between the gauge wheel first portion 12 and the gauge wheel second portion 13 is determined by the typical planting conditions the planting unit assembly is to be operated in.

It should be noted that the present invention is not limited to the specific embodiments pictured and described herein, but is intended to apply to all similar methods for monitoring, indicating or validating depth control and or furrow penetration of a planting, seeding or drill unit during operation. Accordingly, modifications and alterations from the described embodiments will occur to those skilled in the art without departure from the spirit and scope of the present invention.

The invention claimed is:

1. A seed planting assembly comprising:
   a. a laterally extending support member;
   b. a planting unit including a planting frame supported by said support member, wherein said planting unit frame carries:
      i. a furrow opening assembly operable to create a furrow in a ground surface;
      ii. a seed delivery assembly for delivery of seeds into said furrow;
      iii. a furrow closing assembly operable to close said furrow;
      iv. a depth regulating member having a vertical position relative to said furrow opening assembly, wherein said depth regulating member responds to forces upon said planting unit to control ground surface engagement;
      v. an arm assembly connecting said depth regulating member to said planting unit frame;
      vi. a stop member mechanically engaging a portion of said arm assembly for defining a limit for vertical motion of said depth regulating member in the direction substantially opposite said ground surface; and,
      vii. a residue driving member wherein said residue driving member drives residue opposite the direction of travel of said seed planting assembly, wherein said residue driving member is selectively attachable to and detachable from said depth regulating member via an affixing member.

2. The seed planting assembly as set forth in claim 1 wherein said depth regulating member is further defined as a gauge wheel.

3. The seed planting assembly as set forth in claim 2 wherein said residue driving member is further defined as a tire having a diameter from 5 percent to 40 percent less than the diameter of said gauge wheel and wherein said tire has a width from 100 percent to 300 percent greater than the width of said gauge wheel.

4. The seed planting assembly as set forth in claim 2 wherein said residue driving member is further defined as an adjustable diameter wheel.

5. The seed planting assembly as set forth in claim 2 wherein said gauge wheel incorporates both a first and second diameter, wherein said gauge wheel functions both as a depth regulating member and a residue driving member.

6. The seed planting assembly as set forth in claim 5 wherein said gauge wheel incorporates a plurality of diameters to regulate the depth of said furrow opening assembly and functions as both a depth regulating member and a residue driving member.

7. The seed planting assembly as set forth in claim 1 wherein a row cleaning member is positioned anterior with respect to said seed planting assembly.

8. The seed planting assembly as set forth in claim 6 wherein a row cleaning member is positioned anterior with respect to said planting unit and said gauge wheel.

9. The seed planting assembly as set forth in claim 1 wherein said residue driving member and said depth regulating member are cooperatively arranged in pairs on adjacent planting units and wherein the total width of said pairs is less than the row width spacing defined by said adjacent pairs of planting units.

\* \* \* \* \*